United States Patent [19]

Fumei

[11] Patent Number: 4,661,188

[45] Date of Patent: Apr. 28, 1987

[54] METHOD OF APPLYING A PLASTIC LABEL TO A CONTAINER

[75] Inventor: Giancarlo J. Fumei, Perrysburg, Ohio

[73] Assignee: Owens-Illinois, Inc., Toledo, Ohio

[21] Appl. No.: 789,814

[22] Filed: Oct. 21, 1985

Related U.S. Application Data

[62] Division of Ser. No. 555,786, Nov. 28, 1983, Pat. No. 4,567,681.

[51] Int. Cl.[4] .............................................. B32B 31/12

[52] U.S. Cl. ................................ 156/244.11; 156/85; 156/86; 156/229; 156/308.2; 156/308.6; 40/2 R; 40/21 R; 40/310

[58] Field of Search ...................... 156/85, 86, 244.11, 156/304.1, 308.2, 308.4, 308.6, 229; 40/2 R, 21, 306, 310

[56] References Cited

U.S. PATENT DOCUMENTS

| | | | |
|---|---|---|---|
| 3,235,433 | 2/1966 | Cvacho et al. | 156/494 |
| 3,344,222 | 9/1967 | Shapiro et al. | 156/245 |
| 3,589,959 | 6/1971 | Sander et al. | 156/308.6 |
| 3,791,916 | 2/1974 | Eastes | 156/308.6 |
| 3,827,591 | 8/1974 | Spelman et al. | 156/86 |
| 4,574,020 | 3/1986 | Fosnaught | 156/308.6 |

*Primary Examiner*—Caleb Weston
*Attorney, Agent, or Firm*—John R. Nelson

[57] ABSTRACT

The present invention provides, without the drawbacks accompanied by the use of hot melt adhesives, an attractive, easily recycled labelled container, the label, on its underside that is adjacent the container when applied, being provided with a finite area on its leading edge and a finite area on its trailing edge, by applying thereto a solvent for the polymer in each of the finite areas, the finite areas comprising a viscous tacky solution of the polymer in the solvent, the solidifying solution being sufficient to tack and bond the label to container during wrapping.

After the label is wrapped around the container, the bond between the container and label becomes weaker as the solidifying solution hardens so that later the label can be easily and cleanly stripped from the container for recycling.

5 Claims, 6 Drawing Figures

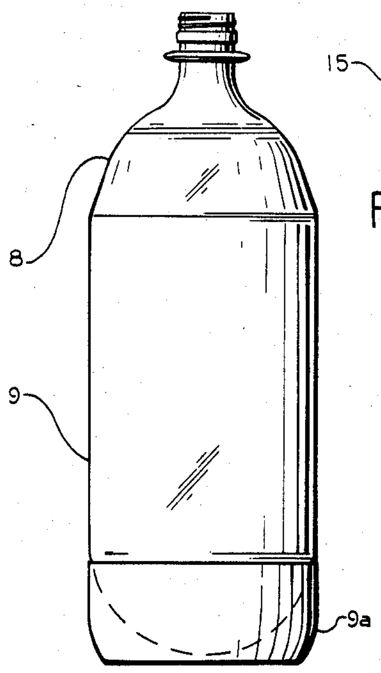
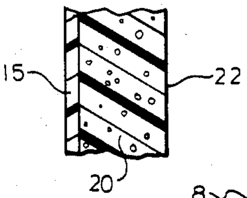
FIG. 4
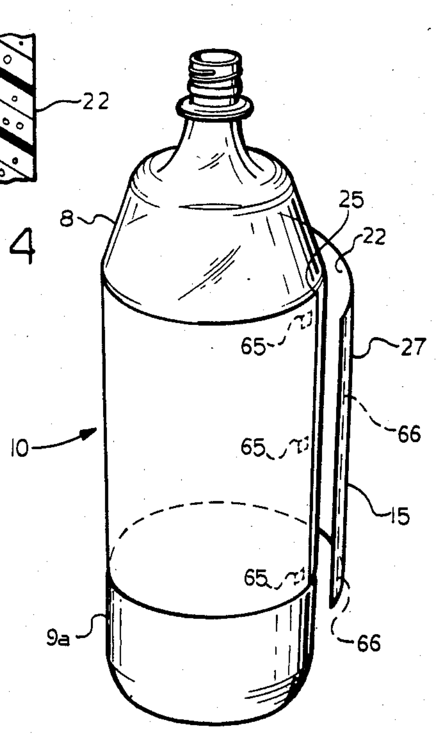
FIG. 1
FIG. 2
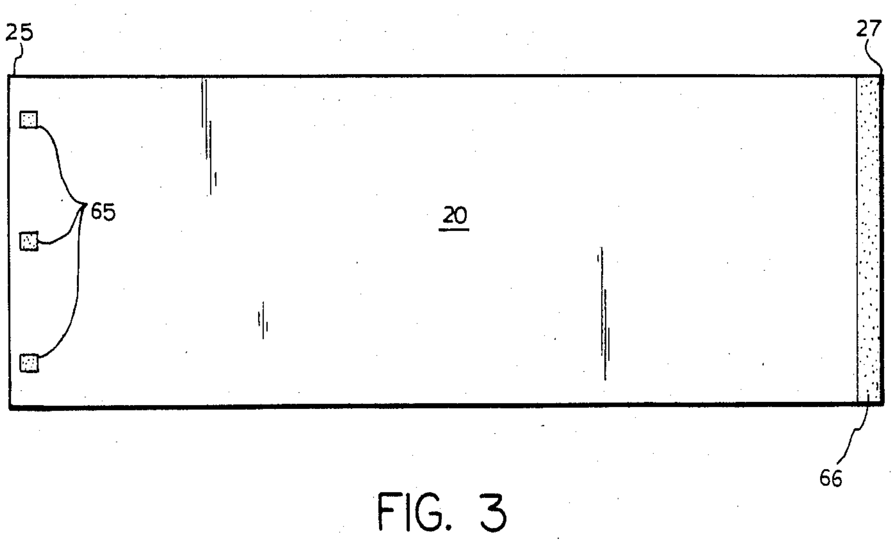
FIG. 3

METHOD OF APPLYING A PLASTIC LABEL TO A CONTAINER

This a division of application Ser. No. 555,786 filed Nov. 28, 1983, now U.S. Pat. No. 4,567,681.

The present invention relates to a container and a plastic label wrapped therearound, and to a method of applying the label to the container.

BACKGROUND OF THE INVENTION

It has been known to utilize mechanical handling apparatus to supply labels to a container. Such apparatus has included a plastic label sheet feed supply, a drum upon which the label is secured and which moves the label into engagement with the outer surface of a container. The label adheres to the container and is subsequently wrapped around the container by rolling it along a fixed surface. U.S. Pat. No. 4,323,416, for instance, shows such an apparatus, the label being glued to the container and its overlapped ends glued together by the use of a glue applicator assembly. Hot melt adhesives have been used to secure the labels to the container and to form a glued side seam when applied to the overlapped label ends.

Other adhesives, with accompanying drawbacks, have been used such as dextrines and other water-based adhesives, and pressure sensitive adhesives. For containers such as oriented plastic carbonated beverage bottles, pressure sensitive adhesives have not been commonly used.

The use of the hot melt adhesive (glue) has been messy and expensive, heat being required to heat the adhesive. There is a hazard of being exposed to possible burning from heaters used to heat the glue. In addition, such as in the case of an oriented plastic container, the label cannot be easily removed from the container and hence the body portion of the container is contaminated and cannot be readily recycled.

OBJECTS OF THE INVENTION

It is an object of the present invention to provide apparatus and methods for quickly and efficiently applying plastic labels to a container in a production basis without using a hot melt adhesive with its resultant drawbacks.

It is an object of the present invention to provide an attractive product that is easily recycled, a plastic label being wrapped around a container using a solvent-seal system that eliminates the drawbacks associated with the use of hot-melt adhesive systems.

It is an object of the present invention to provide a method of labelling containers and the attractive, easily recycled labelled container itself, the container having a neck and a body, and a plastic label wrapped around the body, the label made of a thermoplastic polymer that is printable and is soluble in a solvent, the label comprising a foam polymer layer having a side that contacts the body and is attached lightly but securely thereto, the foam layer having a leading edge for contacting the body, there being a finite area on the leading edge having a liquid viscous solution of a polymer in a solvent for the polymer, the solution in the finite area being adapted to solidify and form a solid bond, the solution forming a momentary tacky bond sufficient to anchor the leading edges to the container body whereby the label can be wrapped around the body, the bond between the label and body becoming weaker as the solidifying solution hardens whereby the label can be easily removed from the container body for recycling without contaminating the material of the container body being reclaimed, the foam layer having a trailing edge that overlaps the leading edge to form a sleeve label with overlapped edges on the container body, and the foam layer of the trailing edge containing a second finite area generally extending along the trailing edge, the second finite area comprising a liquid tacky solution of a polymer in a solvent, the solution solidifying to form a side seam bond on the overlapped edges, the bond becoming stronger whereby upon use, the side seam resists being pulled apart.

DESCRIPTION OF THE DRAWINGS

These and other objects will be apparent from the specification that follows, the appended claims, and the drawings, in which:

FIG. 1 is an elevational view of a container in the form of an oriented plastic container with a base cup;

FIG. 2 is a perspective view of the container of FIG. 1 with a label being partially wrapped around the container;

FIG. 3 is a top plan view of the plastic label shown in FIG. 2, the label having on its underside a plurality of finite areas near its leading edge and a finite area in the form of a strip near its trailing edge, the finite areas formed on the label momentarily before wrapping, the finite areas being a viscous tacky solution of the polymer from the label in a solvent therefor, the solution solidifying to form a solid bond;

FIG. 4 is an enlarged fragmentary sectional view of the plastic label; and

THE INVENTION

Figure 5:
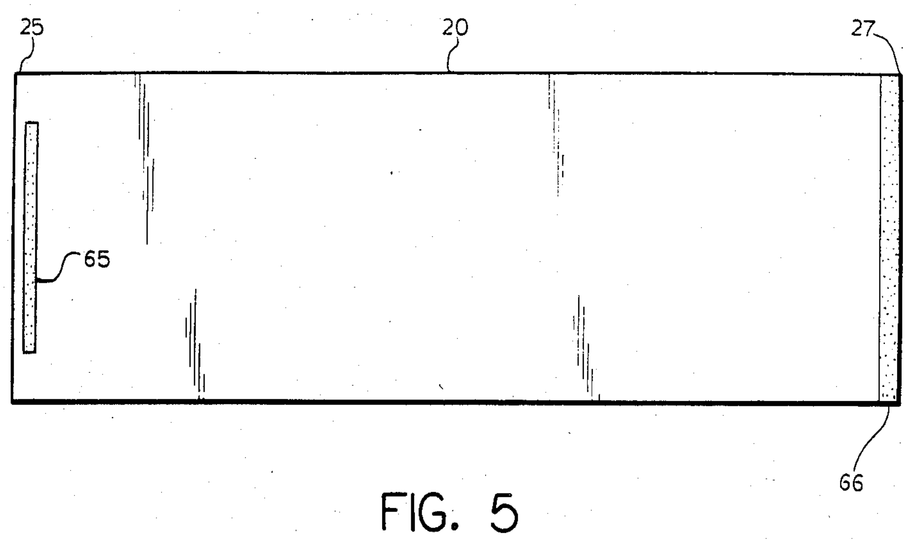
FIGS. 5 and 6 are each top plan views of the plastic label showing different embodiments thereof.
Figure 6:
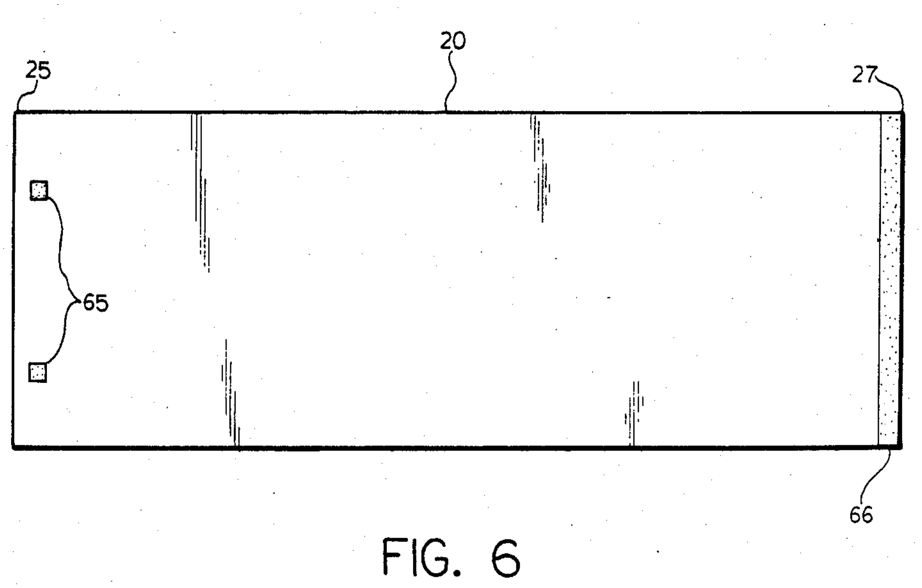

The present invention provides, without the drawbacks accompanied by the use of hot melt adhesive glues, an attractive, easily recycled labelled container, the label, on its underside that is adjacent the container when applied, being provided with a finite area on its leading edge and a finite area on its trailing edge, by applying thereto a solvent for the polymer in each of the finite areas, the finite areas comprising a viscous tacky solution of the polymer in the solvent, the solidifying solution being sufficient to tack and bond the label to container during wrapping.

After the label is wrapped around the container, the bond between the container and label becomes weaker as the solidifying solution hardens so that later the label can be easily and cleanly stripped from the container for recycling.

As used herein, the term solidification refers to a process resulting from solvent evaporation from an applied area or migration into areas adjoining the area of application. The rate of solidification is due to the rate that the above process takes place and is dependent upon the boiling point of the solvent, the amount applied and the solubility of polymer in the solvent.

The present invention also provides a clean and quick method of applying a coextruded plastic label comprising a solid polymer layer and a foam polymer layer to a container having a body portion, the method comprising the steps of:

A. positioning the label around the container body by advancing a leading lateral edge, the foam layer being disposed adjacent the body portion, B. contacting the leading edge of the foam layer with a solvent for the polymer, C. forming a finite area on the foam polymer leading edge from the contacting with the solvent, D. tacking the foam layer to the body portion by placing the finite area with a liquid tacky solution of the polymer in the solvent next to the body portion, E. solidifying the tacky liquid to form a tacky adhesive bond between the foam layer and the body portion, F. forming a finite area containing a liquid tacky solution of foam layer polymer in a solvent on the foam layer side of the trailing edge, G. overlapping the trailing and leading edges to form a seam; and H. bonding the edges of the seam together by solidifying the liquid tacky solution to form a solid bond between the solid plastic layer and the foam polymer layer.

U.S. Pat. No. 3,468,467 to Amberg (assigned to Owens-Illinois, Inc.) shows a two piece plastic cup construction with a solvent seal for the side seam and solvent sealing the bottom in place. The Amberg patent discloses the use of methylene chloride as a solvent for use with the hard, dense polystyrene skin of the cup material. The sealing is performed fairly slowly and the use of pressure on the overlapped edges of the side seam, etc. is disclosed. The text of the Amberg patent contains in several places a prohibition against the use of the solvent in the foam area of the polystyrene material. For instance, see lines 14–20 in column 2.

In sharp contrast, the present inventor uses a solvent sealing system in which the solvent, methylene chloride, is applied directly to the foam polystyrene layer of a plastic label. The methylene chloride very quickly dissolves the polystyrene in the foam. The timing of the solidification of the resultant tacky solution is such that the foam layer can be lightly and securely tacked to the container surface by the solidifying solution within ½ or preferably within ⅓ of a second so it can be wrapped on a production basis. The methylene chloride is also applied to the trailing edge of the polystyrene label to form a finite area on the trailing edge that forms a side seam seal when the label ends are overlapped, the finite area being formed with a solidifying tacky solution of polystyrene in methylene chloride.

As seen in the drawings, a container 8 having a body portion 9 and a base cup 9*a* is shown partially wrapped with a label 10 in FIG. 3.

As seen in FIGS. 2 and 4, in the embodiment shown, the label has an outer solid polymer layer 15 and a foam layer 20. The foam layer 20 has an underside 22, a leading edge 25 and a trailing edge 27. Finite areas 65 are provided on the underside near the leading edge and a finite area 66 is provided on the trailing edge. These finite areas are momentary, solidifying tacky solutions of the polymer in the layer 20 and the solvent therefor, the preferred solution being one of polystyrene in methylene chloride.

The novel container and label therefor of the present invention can be made on a high production basis as shown in. copending U.S. patent application Ser. No. 555,758 filed Nov. 28, 1983 , now U.S. Pat. No. 4,574,020 for an invention of Harold R. Fosnaught, filed the same day as the application, entitled "Apparatus and Method for Wrapping a Plastic Label Around a Container," it being assigned to the same assignee as this application. The disclosure of the above-described application of the apparatus and method for automatically applying plastic labels to containers using a solvent-seal system on a high volume basis is hereby incorporated by reference.

Polystyrene is a highly preferred polymer for the polymer of the finite area to form the momentary tacky solution on the leading edge so the label can be wrapped on the container. A suitable polystyrene foam, which is preferably treated with methylene chloride, is generally a low density foam, say about 3 or 4 up to 14 or 15 lbs. per cubic foot or a medium density foam of about 15 to 28 or 30 lbs per cubic foot.

Other preferred polymers that can be used for part or all of the polystyrene, for most applications, are styrenic polymers such as copolymers of styrene and a vinyl copolymerizable monomer including vinyl acetate, vinyl chloride, vinylidene chloride and acrylic and acrylate monomers such as methyl methacrylate and ethyl methacrylate. It is preferred that the amount of styrene in styrenic polymer be at least about 40 or 50% by weight and, for best results, about 60 to 75%.

Polymers that can be used in place of polystyrene at least for some applications include polyvinylchloride and acrylic and acrylate polymers such as polymethyl methacrylate polyethyl methacrylate, polymethylacrylate, polyethylacrylate and poly (acrylic acid).

The thickness of the foam layer can vary from about 1 or 2 mils up to about 15 or 20 mils, but the preferred thickness is about 8 to 10 mils.

An outstanding label that has been used is one that is multilayered. The multilayered label can be laminated, but is preferably a coextruded structure of a solid polymer layer and a foamed layer. The solid layer of the multilayered label can be about ½ to 5 mils in thickness and the foam layer about 5 to 20 and preferably 8 to 12 mils. As previously indicated the preferred multilayered label is one of polystyrene.

Methylene chloride is a highly preferred solvent for use with the polystyrene foam. Methylene chloride, as set forth in the literature such as in the Solvents Chart in the 1968 Modern Plastics Encyclopedia, pg. 66, or in Plastics Engineering Handbook, 4th Edition, 1976 (Frados) or in Polymer Handbook, 2nd Edition, 1975 (Bandrup and Immergut); has a boiling point of about 39.8° C. and a solubility parameter of 9.7 $(cal/cm^3)^{1/2}$.

Generally, solvents having a solubility parameter of about 8.4 to 10.0 can be substituted for all or part of the methylene chloride.

Solvents for polystyrene that are suitable for use in the present invention include benzene, toluene, styrene, other lower chlorinated aliphatic hydrocarbons (such as trichloroethylene and perchloroethylene), methyl ethyl ketone and ethyl acetate.

Preferably, the boiling points of the solvents or suitable mixtures thereof are about 35° to 85° C. when the solvent is applied to the polystyrene foam at about room temperature (25° C.) or about 22° to 28° C.

Solvents suitable for use with polyvinyl chloride are benzene, toluene, ethylbenzene, styrene, and lower chlorinated aliphatic hydrocarbons including trichloroethylene and perchloroethylene. As in the case of polystyrene, methylene chloride is the preferred solvent.

Methylene chloride is the preferred solvent for the polyacrylates, other suitable solvents being those listed above for polyvinyl chloride.

Although not as preferred for polyvinylchloride and polyacrylates suitable solvents that can be used are methyl ethyl ketone, methyl formate, ethylene chloride and ethyl acetate.

in the table headed "Solvents and Non-Solvents", Section IV, pages 241–265, and pages 349–359 of the previously mentioned Polymer Handbook; the solubility parameter for polyvinyl chloride generally is from about 9.4 to 10.8 $(cal/cm^3)^{\frac{1}{2}}$ and for acrylate polymers and acrylic polymers is from about 8.2 to 11. As used in the above table, the solubility parameter of a polymer is defined at page IV-337 as the same as that of a solvent in which the polymer will mix (a) in all proportions, (b) without heat change, (c) without volume change, and (d) without reaction or special association.

The solvent used in the present invention can be a single solvent or a mixture of solvents. The solvent can be a solvent-polymer system in which the polymer is compatible with the label polymer. When the label polymer is polystyrene, a solvent-polymer system is one in which polystyrene has been dissolved in the solvent. A compatible polymer for polystyrene is a styrenic polymer as previously described.

Such solvent polymer systems as well as a single solvent or mixture of solvents, create the finite areas of the underside of the label by forming the momentary tacky solution of the polymer of the finite area in the solvent that allows the label to be tacked to the container for wrapping and also allows the label ends to be overlapped and stuck together to form the side seam.

I claim:

1. A method of coextruded plastic label comprising a solid polymer layer and a foam polymer layer to a container having a body portion, the method comprising the steps of:

A. positioning the label around the container body by advancing a leading lateral edge, the foam layer being disposed adjacent the body portion, B. contacting the leading edge of the foam layer with a low boiling solvent for the polymer of the foam layer, C. forming a finite area on the foam polymer leading edge from the contacting with the solvent, D. tacking the foam layer to the body portion by placing the finite area with a liquid tacky solution of the polymer in the solvent next to the body portion, E. solidifying the tacky liquid to form a tacky bond between the foam layer and the body portion that becomes weaker and weaker, F. forming a finite area containing a liquid tacky solution of foam layer polymer in a solvent on the foam layer side of the trailing edge, G. overlapping the trailing and leading edges to form a seam; and H. bonding the edges of the seam together by solidifying the liquid tacky solution to form a solid bond between the solid polymer layer and the foam polymer layer.

2. A method as defined in claim 1 in which the polymer of the foam layer is polystyrene and the solvent is methylene chloride.

3. A method as defined in claim 1 in which the container is an oriented polyethylene terephthalate carbonated beverage bottle.

4. A method as defined in claim 1 in which the polymer of the foam layer is polyvinyl chloride.

5. A method as defined in claim 1 in which the polymer of the foam layer is an acrylate polymer.

* * * * *